(12) United States Patent
Ota et al.

(10) Patent No.: US 7,113,369 B2
(45) Date of Patent: Sep. 26, 2006

(54) HEAD SLIDER, HEAD GIMBAL ASSEMBLY, AND HARD DISK DRIVE

(75) Inventors: Norikazu Ota, Tokyo (JP); Tetsuro Sasaki, Tokyo (JP); Nobuya Oyama, Tokyo (JP); Soji Koide, Tokyo (JP)

(73) Assignee: TDK Corporation, Tokyo (JP)

( * ) Notice: Subject to any disclaimer, the term of this patent is extended or adjusted under 35 U.S.C. 154(b) by 460 days.

(21) Appl. No.: 10/764,460

(22) Filed: Jan. 27, 2004

(65) Prior Publication Data

US 2004/0257706 A1    Dec. 23, 2004

(30) Foreign Application Priority Data

Jan. 31, 2003    (JP)    .......................... P2003-024621

(51) Int. Cl.
*G11B 5/60* (2006.01)

(52) U.S. Cl. .................................. 360/234.5

(58) Field of Classification Search ............ 360/234.5, 360/245.8, 245.9, 246, 281.7, 234.4, 234.7, 360/234.8, 324, 128
See application file for complete search history.

(56) References Cited

U.S. PATENT DOCUMENTS

| 5,530,604 | A | * | 6/1996 | Pattanaik | ................. | 360/234.5 |
|---|---|---|---|---|---|---|
| 5,657,186 | A | | 8/1997 | Kudo et al. | ................. | 360/104 |
| 5,889,636 | A | * | 3/1999 | Arya et al. | ............... | 360/234.5 |
| 6,813,118 | B1 | * | 11/2004 | Pust et al. | ............... | 360/234.5 |
| 6,920,020 | B1 | * | 7/2005 | Yamanaka et al. | .......... | 360/317 |
| 7,027,264 | B1 | * | 4/2006 | Subrahmanyam et al. | ....................... | 360/234.5 |
| 2002/0122276 | A1 | * | 9/2002 | Onodera | .................. | 360/234.5 |
| 2004/0114268 | A1 | * | 6/2004 | Satoh et al. | ................... | 360/75 |
| 2004/0165311 | A1 | * | 8/2004 | Yamanaka et al. | .......... | 360/128 |
| 2004/0184192 | A1 | * | 9/2004 | Ota et al. | .................... | 360/128 |
| 2004/0246623 | A1 | * | 12/2004 | Yazawa | .................... | 360/234.5 |
| 2005/0041340 | A1 | * | 2/2005 | Sasaki et al. | ................ | 360/324 |
| 2005/0047024 | A1 | * | 3/2005 | Yamazaki et al | ........ | 360/294.5 |
| 2005/0094316 | A1 | * | 5/2005 | Shiramatsu et al. | ...... | 360/234.5 |
| 2005/0213250 | A1 | * | 9/2005 | Kurita et al. | ............. | 360/234.4 |
| 2006/0077591 | A1 | * | 4/2006 | Kurihara et al. | ............ | 360/128 |
| 2006/0092570 | A1 | * | 5/2006 | Payne et al. | ............. | 360/236.5 |
| 2006/0119971 | A1 | * | 6/2006 | Kurita et al. | .................. | 360/69 |
| 2006/0126224 | A1 | * | 6/2006 | Sakamoto et al. | .......... | 360/128 |

* cited by examiner

*Primary Examiner*—Allen Cao
(74) *Attorney, Agent, or Firm*—Oliff & Berridge, PLC (57) ABSTRACT

In the head slider of the present invention, recording and reproducing electrode pads and heater electrode pads are attached to the same surface of an overcoat layer. The heater electrode pads are located on both sides of a group constituted by the recording and reproducing electrode pads. As a consequence, leads for the heater are located between respective leads for recording and reproducing head parts, whereby crosstalk can be prevented from occurring between the leads for the recording and reproducing head parts.

5 Claims, 7 Drawing Sheets

HEAD SLIDER, HEAD GIMBAL ASSEMBLY, AND HARD DISK DRIVE

BACKGROUND OF THE INVENTION

1. Field of the Invention

The present invention relates to a head slider, a head gimbal assembly, and a hard disk drive, each including a thin-film magnetic head comprising a magnetoresistive device and an inductive electromagnetic transducer.

2. Related Background Art

In general, a head gimbal assembly is constructed by mounting a head slider formed with a thin-film magnetic head to a gimbal and connecting the gimbal to a suspension. The surface of the gimbal located on the leading end side of the gimbal is provided with a plurality of electrode pads for energizing a magnetoresistive device for reproducing and an inductive electromagnetic transducer for recording which are formed in the thin-film magnetic head (see, for example, Japanese Unexamined Patent Publication No. HEI 8-111015).

One ends of leads for inputting/outputting electric signals to/from the thin-film magnetic head are connected to the respective electrode pads. The leads travel on the gimbal about the head slider so as to reach the base end of the suspension, whereas their other ends are connected to signal terminals of a magnetic disk drive. A fixed current (sense current) is always supplied to the magnetoresistive device via the reproducing lead.

SUMMARY OF THE INVENTION

Since the leads for the magnetoresistive device and inductive electromagnetic transducer travel in parallel on the gimbal, however, a phenomenon in which noises are imposed on the lead for the magnetoresistive device when a current is supplied to the inductive electromagnetic transducer, i.e., crosstalk, may occur in the conventional head gimbal assembly mentioned above.

It is an object of the present invention to provide a head slider, a head gimbal assembly, and a hard disk drive which can prevent crosstalk from occurring between the respective leads of the magnetoresistive device and inductive electromagnetic transducer.

The present invention provides a head slider including a thin-film magnetic head comprising a magnetoresistive device for reproducing, an inductive electromagnetic transducer for recording, and a heater adapted to generate heat upon energization; the head slider having a surface provided with a first device electrode pad for energizing the magnetoresistive device, a second device electrode pad for energizing the inductive electromagnetic transducer, and heater electrode pads for energizing the heater; the heater electrode pads being located on both sides of a group of the first and second device electrode pads.

Within the same surface in the head slider of the present invention, the heater electrode pads are disposed on the outside of the first device electrode pad for the magnetoresistive device and the second device electrode pad for the inductive electromagnetic transducer. Leads connected to the electrode pads are turned around from the surface provided with the electrode pads, so as to travel the surroundings of the head slider toward the rear side thereof. Here, the two leads of the heater hold the slider therebetween. Therefore, the leads connected to the heater electrode pads are located between the respective leads connected to the first and second device electrode pads. As a consequence, the respective leads for the inductive electromagnetic transducer and magnetoresistive device are separated from each other by the leads of the heater, whereby the crosstalk to the lead of the magnetoresistive device can be prevented from occurring even when a current is supplied to the lead of the inductive electromagnetic transducer.

When the heater is energized, the resulting heat thermally expands its surrounding layers, whereby the distance between the head slider (the magnetoresistive device in particular) and the recording medium can be adjusted.

The present invention provides a head gimbal assembly comprising a head slider formed with a thin-film magnetic head, and an arm mounted with the head slider; the thin-film magnetic head comprising a magnetoresistive device for reproducing, an inductive electromagnetic transducer for recording, and a heater adapted to generate heat upon energization; the head slider having a surface provided with a first device electrode pad for energizing the magnetoresistive device, a second device electrode pad for energizing the inductive electromagnetic transducer, and heater electrode pads for energizing the heater; the heater electrode pads being located on both sides of a group of the first and second device electrode pads. Preferably, respective energizing leads connected to the first device electrode pad, second device electrode pad, and heater electrode pads are turned around from the surface provided with the electrode pads so as to extend toward the base end side of the arm, whereas the leads for the heater electrode pads are located between the first and second device electrode pads in a region between the surface provided with the electrode pads and the base end of the arm.

Within the same surface of the head slider in the head gimbal assembly of the present invention, the heater electrode pads are disposed on the outside of the first device electrode pad for the magnetoresistive device and the second device electrode pad for the inductive electromagnetic transducer. Leads connected to the electrode pads are turned around from the leading end side of the arm, so as to travel toward the base end side of the arm. Here, the two leads of the heater hold the slider therebetween. Therefore, the leads connected to the heater electrode pads are located between the respective leads connected to the first and second device electrode pads. As a consequence, the respective leads for the inductive electromagnetic transducer and magnetoresistive device are separated from each other by the leads of the heater, whereby the crosstalk to the lead of the magnetoresistive device can be prevented from occurring even when a current is supplied to the lead of the inductive electromagnetic transducer.

The present invention provides a hard disk drive including a head gimbal assembly comprising a head slider formed with a thin-film magnetic head, and an arm mounted with the head slider; the thin-film magnetic head comprising a magnetoresistive device for reproducing, an inductive electromagnetic transducer for recording, and a heater adapted to generate heat upon energization; the head slider having a surface provided with a first device electrode pad for energizing the magnetoresistive device, a second device electrode pad for energizing the inductive electromagnetic transducer, and heater electrode pads for energizing the heater; the heater electrode pads being located on both sides of a group of the first and second device electrode pads. Preferably, respective energizing leads connected to the first device electrode pad, second device electrode pad, and heater electrode pads are turned around from the surface provided with the electrode pads so as to extend toward the base end side of the arm, whereas the leads for the heater electrode pads are located between the first and second device electrode pads in a region between the surface provided with the electrode pads and the base end of the arm.

Within the same surface of the head slider in the hard disk drive of the present invention, the heater electrode pads are disposed on the outside of the first device electrode pad for the magnetoresistive device and the second device electrode pad for the electromagnetic transducer. Leads connected to the electrode pads are turned around from the leading end side of the arm, so as to travel toward the base end side of the arm. Here, the two leads of the heater hold the slider therebetween. Therefore, the leads connected to the heater electrode pads are located between the respective leads connected to the first and second device electrode pads. As a consequence, the respective leads for the inductive electromagnetic transducer and magnetoresistive device are separated from each other by the leads of the heater, whereby the crosstalk to the lead of the magnetoresistive device can be prevented from occurring even when a current is supplied to the lead of the inductive electromagnetic transducer.

DESCRIPTION OF THE PREFERRED EMBODIMENTS

In the following, preferred embodiments of the present invention will be explained in detail with reference to the accompanying drawings. Constituents identical to each other will be referred to with numerals identical to each other without repeating their overlapping descriptions.

Figure 1:
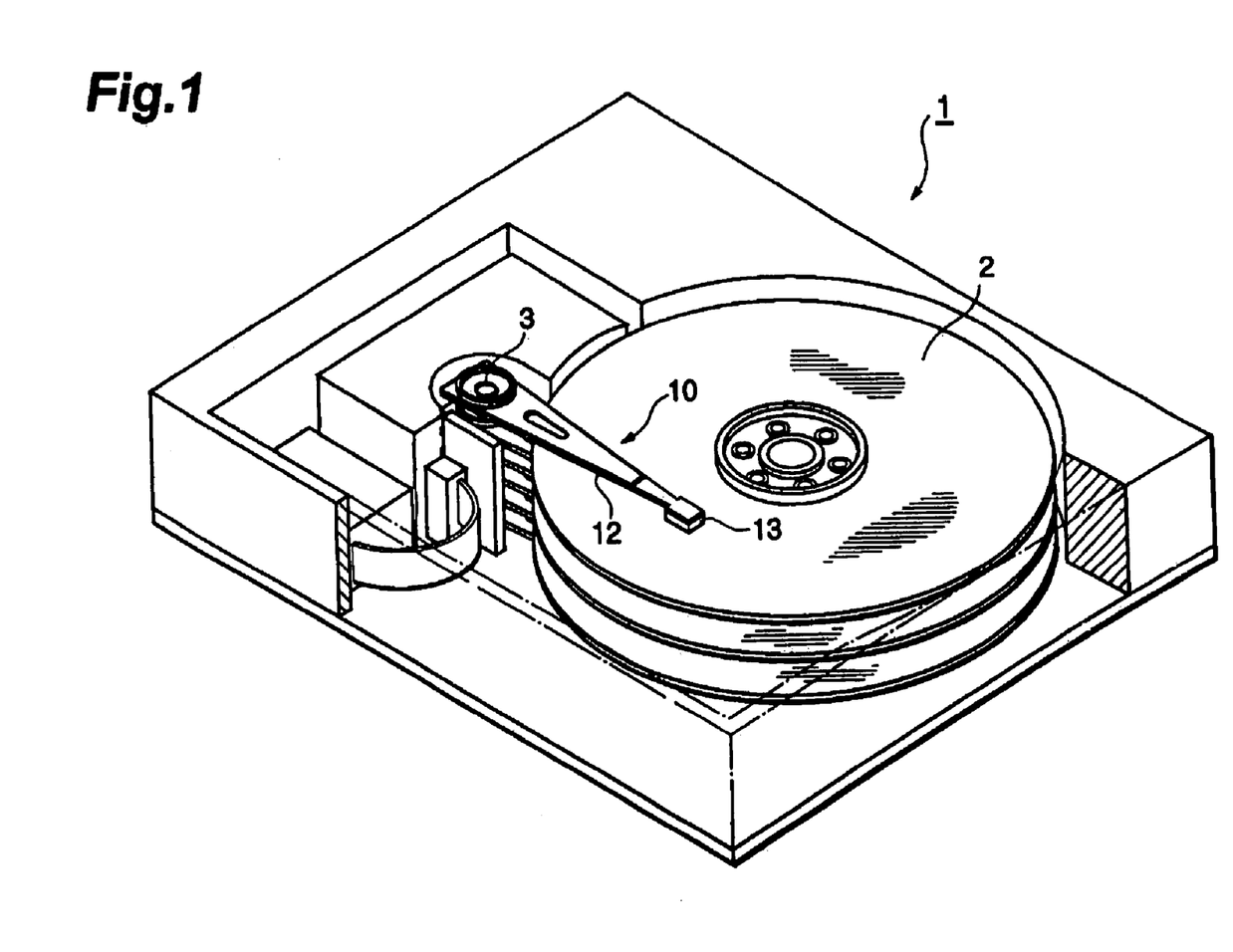
FIG. 1 is a perspective view showing an embodiment of the hard disk drive comprising a head slider of the present invention.
Figure 2:
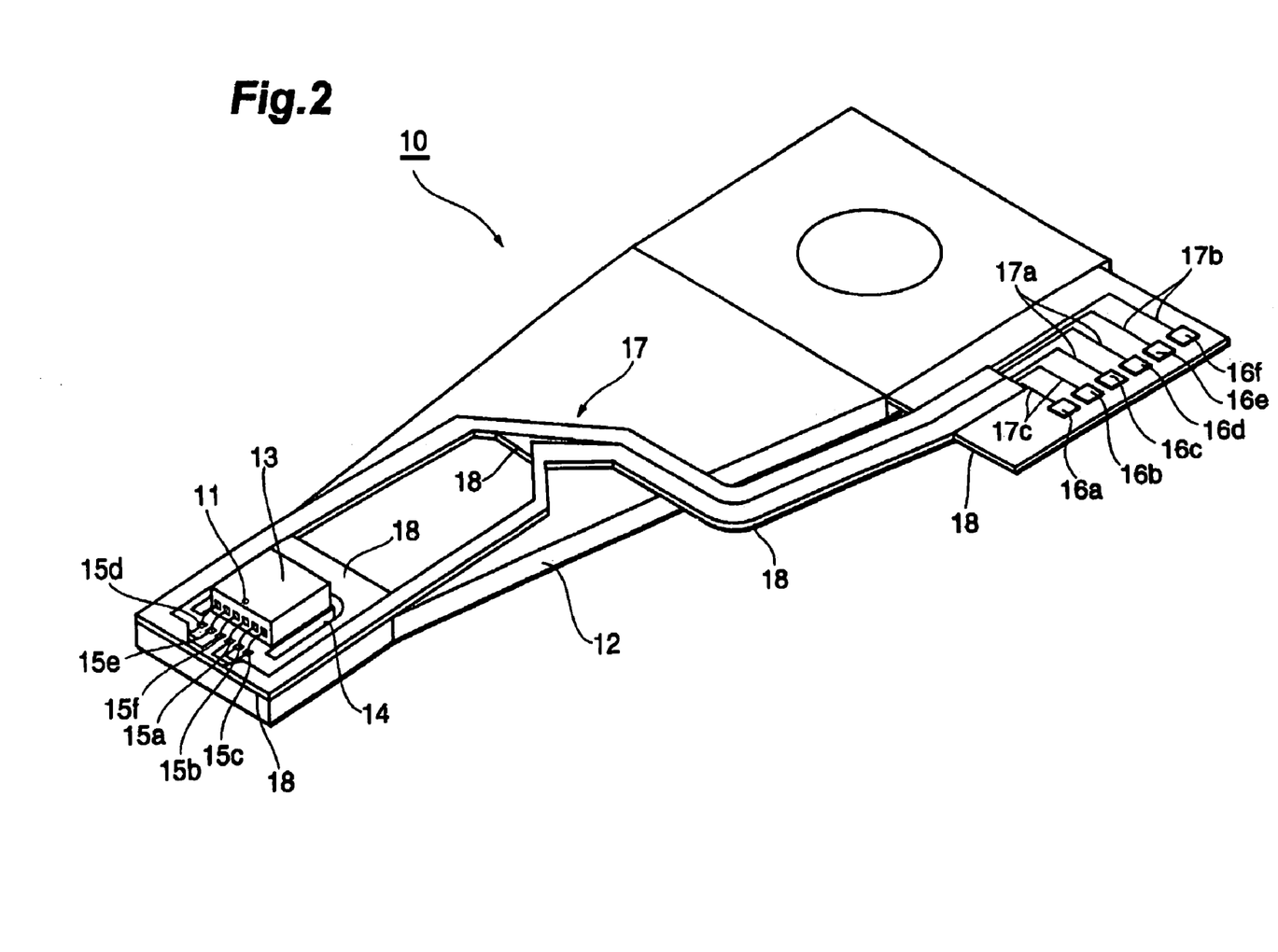
FIG. 2 is a perspective view showing a head gimbal assembly mounted with a head slider formed with a thin-film magnetic head, which is included in the hard disk drive shown in FIG. 1.
Figure 3:
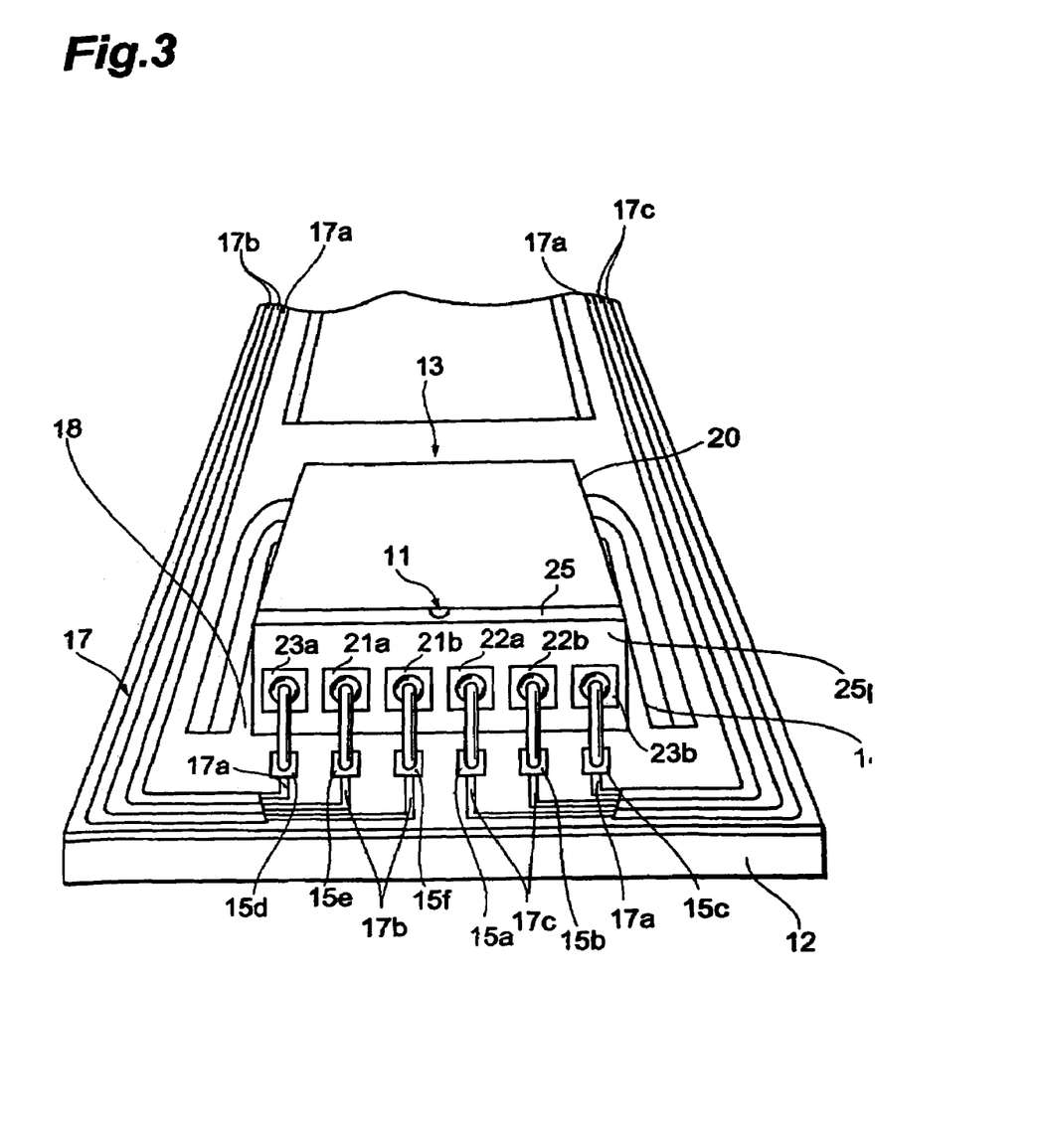
FIG. 3 is an enlarged view of the head slider shown in FIG. 2.

FIG. 1 is a perspective view showing a hard disk drive 1 including a head gimbal assembly 10 mounted with a head slider 13 in accordance with an embodiment. FIG. 2 is an enlarged perspective view of the head gimbal assembly 10. FIG. 3 is an enlarged view of the head slider 13 shown in FIG. 2.

In the hard disk drive 1, the head gimbal assembly 10 is actuated so as to cause a thin-film magnetic head 11 to record and reproduce magnetic information onto/from a hard disk (recording medium) 2 rotating at a high speed. The thin-film magnetic head 11 comprises an electromagnetic transducer for recording information onto the hard disk, and a magnetoresistive device (which may also be referred to as "MR device" hereinbelow) for reproducing information of the hard disk.

The head gimbal assembly 10 can be rotated about a shaft 3 by a voice coil motor, for example. As the head gimbal assembly 10 is rotated, the head slider 13 travels radially of the hard disk 2, i.e., in directions traversing track lines.

As shown in FIGS. 2 and 3, the head gimbal assembly 10 comprises a suspension arm 12 which is a thin plate made of a metal. On the leading end side, the suspension arm 12 is formed with a tongue 14 surrounded by a cutout. The head slider 13 is mounted on the tongue 14.

Referring to FIG. 3, the head slider 13 will be explained further in detail. The head slider 13 comprises a support 20, formed from AlTiC ($Al_2O_3.TiC$), having a substantially rectangular parallelepiped form, and the thin-film magnetic head 11 formed thereon. Though the thin-film magnetic head 11 is formed near the horizontal center of the support 20 in FIG. 3, the forming position is not limited thereto. The upper face of the head slider 13 in the drawing is a medium-opposing surface which opposes the recording surface of the hard disk 2, and is referred to as an air bearing surface (ABS) S. As the hard disk 2 rotates, an airflow accompanying the rotation levitates the head slider 13, thereby separating the air bearing surface S from the recording surface of the hard disk 2. Though not depicted, the air bearing surface S is formed with a slider rail for adjusting the amount of levitation.

For protecting the thin-film magnetic head 11, an overcoat layer 25 is provided on the surface of the head slider 13 on the front side in the drawing. The surface of the overcoat layer 25 is a pad forming surface 25p to be formed with electrode pads. This surface 25p is formed with a pair of heater electrode pads 23a, 23b (whose heater will be explained later), a pair of recording electrode pads (second device electrode pads) 21a, 21b, and a pair of reproducing electrode pads (first device electrode pads) 22a, 22b. Namely, the electrode pads are disposed on the same surface.

The pair of heater electrode pads 23a, 23b are located on both sides of a group of the recording electrode pads 21a, 21b and reproducing electrode pads 22a, 22b so as to hold the group therebetween. Though the reproducing electrode pads 22a, 22b are attached to the right side of the recording electrode pads 21a, 21b, their positions may be reversed.

On the leading end side of the suspension arm 12, six terminals 15a to 15f are arranged in parallel. The recording electrode pads 21a, 21b are connected to the terminals 15e, 15f, respectively. The reproducing electrode pads 22a, 22b are connected to the terminals 15a, 15b, respectively. The heater electrode pads 23a, 23b are connected to the terminals 15d, 15c, respectively. For connecting the electrode pads to their corresponding terminals 15a to 15f, ball bonding using gold as a material for bonding (gold ball bonding) is utilized, for example.

A printed wiring pattern 17 having leads 17a to 17c insulated by coating is disposed on the suspension arm 12. The printed wiring pattern 17 electrically connects the upper terminals 15a to 15f to terminals 16a to 16f (see FIG. 2) disposed on the base end side of the suspension arm 12. The leads 17a to 17c of the printed wiring pattern 17 are provided two by two. The leads 17a, 17a are electrically connected to the heater electrode pads 23a, 23b by way of the terminals 15d, 15c. The leads 17b, 17b are electrically connected to the recording electrode pads 21a, 21b by way of the terminals 15e, 15f. The leads 17c, 17c are electrically connected to the reproducing electrode pads 22a, 22b by way of the terminals 15a, 15b.

As shown in FIG. 2, the printed wiring pattern 17 travels from the pad forming surface 25p toward the base end side of the suspension arm 12 by way of the surroundings (sides)

of the head slider 13, so as to extend into the vicinity of the terminals 16a to 16f. Namely, the printed wiring pattern 17 travels so as to turn around toward the arm base end side from the surface of the head slider located on the side opposite from the arm base end. The leads 17a, 17a are connected to the terminals 16c, 16d. The leads 17b, 17b are connected to the terminals 16e, 16f. The leads 17c, 17c are connected to the terminals 16a, 16b. The terminals 16a to 16fare connected to a head amplifier (not depicted) or the like for carrying out recording and reproducing signal processing.

The head slider 13, printed wiring pattern 17, and terminals 15a to 15f, 16a to 16fare arranged on the suspension arm 12 by way of an insulating layer 18, so as to be electrically insulated from the suspension arm 12 made of a metal.

The foregoing configuration energizes the MR device, electromagnetic transducer, and heater of the thin-film magnetic head 11 via the terminals 15a to 15f.

Figure 4:
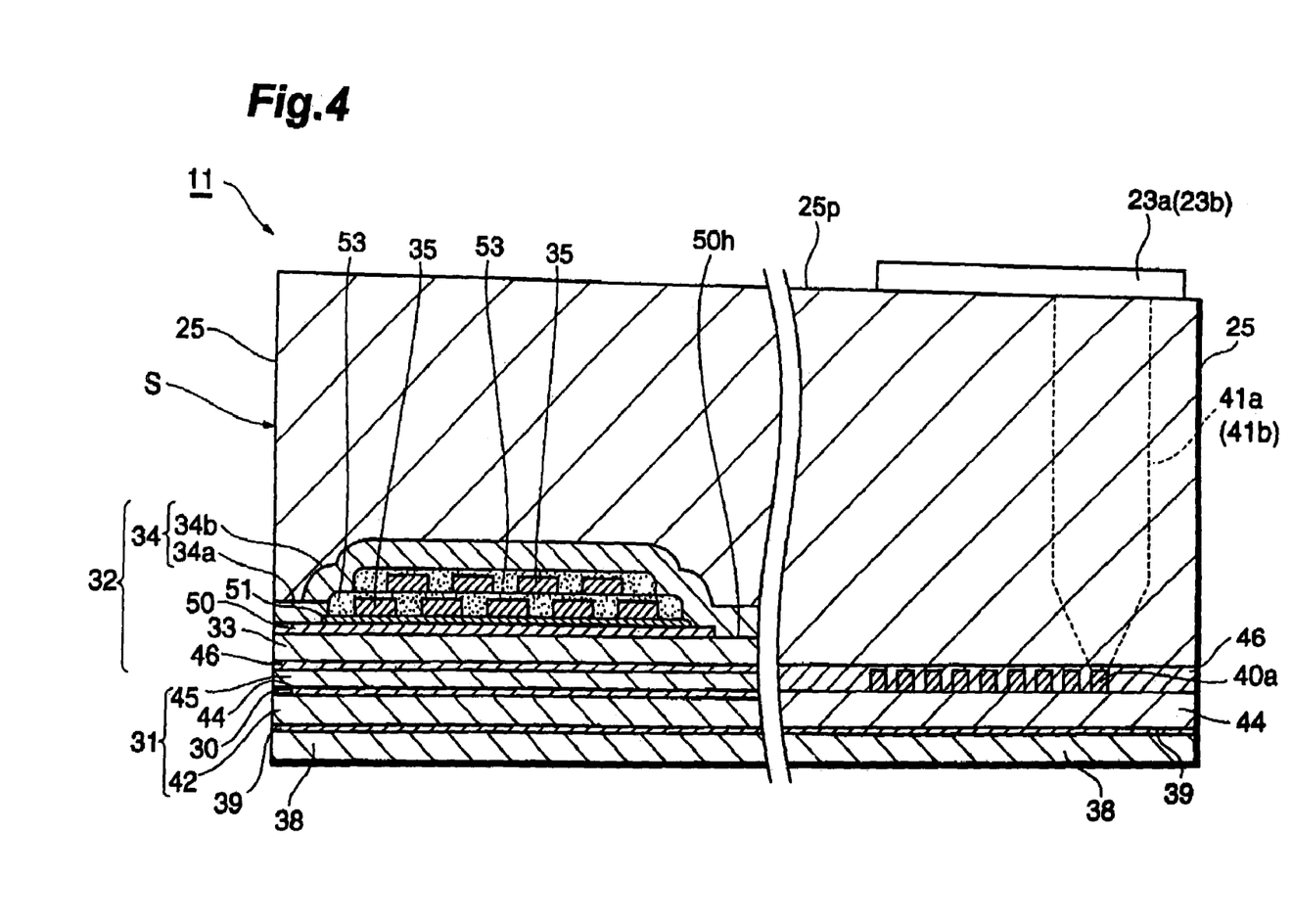
FIG. 4 is a schematic sectional view of the thin-film magnetic head taken along a line perpendicular to the air bearing surface.

FIG. 4 is a schematic sectional view of the thin-film magnetic head 11 taken along a line perpendicular to the air bearing surface S. The thin-film magnetic head 11 is a combination thin-film magnetic head in which a reproducing head part 31 having a GMR (Giant MagnetoResistive) device 30 for reproducing, and a recording head part 32 acting as an inductive electromagnetic transducer for recording are laminated on the support 20. The GMR device utilizes a giant magnetoresistive effect yielding a high magnetoresistance change ratio.

The recording head part 32, which employs a so-called in-plane recording scheme, mainly comprises a lower magnetic pole 33, an upper magnetic pole 34 magnetically connected to the lower magnetic pole 33 while holding the lower magnetic pole 33 between the GMR device 30 and the upper magnetic pole 34, and a two-layer thin-film coil 35 partly located between the lower magnetic pole 33 and upper magnetic pole 34.

The upper magnetic pole 34 is constituted by a magnetic pole part layer 34a located on the air bearing surface S side and a yoke part layer 34b, connected to the magnetic pole part layer 34a, bypassing the thin-film coil 35 thereunder.

A heater 40a formed from Cu, NiFe, Ta, Ti, CoNiFe alloy, FeAlSi alloy, or the like is disposed on the side of the GMR device 30 opposite from the air bearing surface S, i.e., on the rear side of the GMR device 30 as seen from the air bearing surfaces. The heater 40a thermally expands its surrounding layers by heat generated upon energization, thereby adjusting the distance between the head slider (the GMR device 30 in particular) and the hard disk 2.

The heater 40a has a meandering form (see FIG. 5) with both ends electrically connected to two electrically conductive parts 41a, 41b, made of an electrically conductive material such as Cu, extending upward in the drawing, respectively. The heater electrode pads 23a, 23b are attached to upper ends (at the pad forming surface 25p of the overcoat layer 25) of the electrically conductive parts 41a, 41b, respectively.

Similarly, two electrically conductive parts (not depicted) formed from an electrically conductive material are electrically connected to each of the reproducing head part 31 and recording head part 32, so as to be connected to the reproducing electrode pads 22a, 22b or the recording electrode pads 21a, 21b, respectively.

Figure 5:
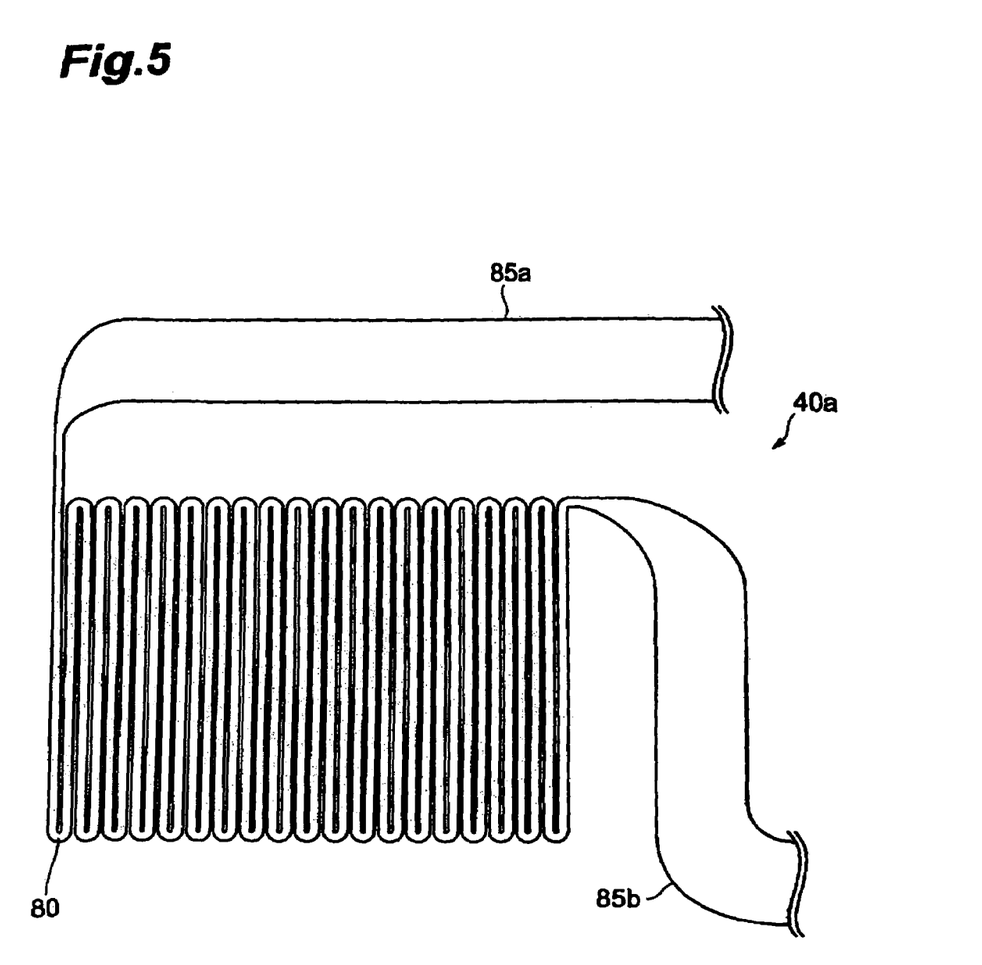
FIG. 5 is a plan view showing an example of a heater.

FIG. 5 is a plan view showing an example of the heater 40a. The heater 40a has a so-called meander structure in which a single line is winding, both ends of which are connected to extraction electrodes 85a, 85b, respectively.

The extraction electrodes 85a, 85b are connected to the electrically conductive parts 41a, 41b shown in FIG. 4, respectively.

The heater 40a is dimensioned, for example, such that the meandering line pitch is 3 μm, the line width is 2 μm, and the distance between adjacent parts of the line is 1 μm. The heater 40a generates heat when energized by applying a voltage between the heater electrode pads 23a, 23b (e.g., causing a current of about 20 mA to flow).

Since the electrically conductive parts 41a, 41b, heater electrode pads 23a, 23b, recording electrode pads 21a, 21b, and reproducing electrode pads 22a, 22b are disposed in parallel in a direction perpendicular to the sheet surface of FIG. 4, only the electrically conductive part 41a and heater electrode pad 23a in the heater 40a are shown in FIG. 4.

In thus configured head slider 13, the heater electrode pads 23a, 23b are disposed on both sides of the group of the recording electrode pads 21a, 21b and reproducing electrode pads 22a, 22b within the same plane as shown in FIG. 3. The leads 17a to 17c connected to the electrode pads are turned around from the leading end side of the suspension arm 12, so as to travel the surroundings of the head slider 13 toward the base end side of the suspension arm 12.

Therefore, in the printed wiring pattern 17, the leads 17a, 17a electrically connected to the heater electrode pads 23a, 23b are located between a pair of leads 17b, 17b electrically connected to the recording electrode pads 21a, 21b and a pair of leads 17c, 17c electrically connected to the reproducing electrode pads 22a, 22b in a region behind the head slider 13 in the printed wiring pattern. 17, more specifically a region between the surface 25p provided with the electrode pads and the base end of the suspension arm 12.

Therefore, the leads 17b, 17b of the recording head part 32 and the leads 17c, 17c of the reproducing head part. 31 are separated from each other by the leads 17a, 17a of the heater 40a. As a consequence, even when a current is supplied to the leads 17b, 17b of the recording head part 32, no noises are imposed on the leads 17c, 17c of the reproducing head part 31, whereby crosstalk is prevented from occurring.

With reference to FIG. 4, an example of method of making a thin-film magnetic head will now be explained.

First, on a substrate 38 made of AlTiC $Al_2O_3.TiC$) or the like, an undercoat layer 39 made of an insulating material such as alumina ($Al_2O_3$) is formed with a thickness of about 1 μm to about 10 μm, for example. The substrate 38 and undercoat layer 39 will become the support 20 for the head slider. Subsequently, a lower shield layer 42 made of a ferromagnetic material is formed on the undercoat layer 39.

Then, a GMR device 30 is formed on the lower shield layer 42 by a known technique. The GMR device 30 is constituted by a plurality of films in practice, but is depicted as a single layer. Next, an insulating layer 44. made of $Al_2O_3$ or the like is formed by sputtering, for example, so as to cover the lower shield layer 42 and GMR device 30.

Subsequently, an upper shield layer 45 is formed with a thickness of about 1.0 μm to about 4.0 μm, for example, by plating so as to cover the lower shield layer 42 and GMR device 30. Simultaneously with the forming of the upper shield layer 45, a heater 40a made of an electrically conductive material such as Cu, NiFe, Ta, Ti, CoNiFe alloy, and FeAlSi alloy is formed on the insulating layer 44 by the same processing (e.g., plating) as with the making of the upper shield layer 45. The height of the heater 40a is on a par with that of the upper shield layer 45, for example. The upper shield layer 45 and the heater 40a can be formed at the same time if they are made of the same material.

Next, on the upper shield layer 45 and heater 40*a*, an insulating layer 46 made of an insulating material such as $Al_2O_3$ is laminated, for example, by sputtering with such a thickness that the upper face of the heater 40*a* is covered therewith. Thereafter, the surface of the insulating layer 46 is ground flat. Here, the insulating layer 46 has a thickness of about 0.1 µm to about 0.5 µm on the upper shield layer 45 and is thicker behind the upper shield layer 45. The foregoing yields the reproducing head part 31. The insulating layer 46 may be laminated by a thickness of about 0.1 µm to about 0.5 µm from the beginning. In this case, the insulating layer 46 is formed, and then an overcoat layer 25, which will be explained later, is formed so as to cover the part of heater 40*a* protruding from the insulating layer 46.

Subsequently, a lower magnetic pole 33 made of permalloy, for example, is formed on the insulating layer 46 by sputtering, for instance. Then, a nonmagnetic layer 50 is formed on the lower magnetic pole 33 by sputtering, for example, and a photoresist layer 51 is formed on the nonmagnetic layer 50. In the nonmagnetic layer 50, a contact hole 50*h* is formed by photolithography and dry etching.

A first stage of thin-film coil 35 is formed with a thickness of about 1 µm to about 3 µm on the photoresist layer 51 by utilizing photolithography, plating, and the like, and then a photoresist layer 53 is formed on the thin-film coil 35. A part of the thin-film coil 35 is located between the lower magnetic pole 33 and upper magnetic pole 34.

After forming the first stage of thin-film coil 35, a magnetic pole part layer 34*a* of an upper magnetic pole 34 is formed, and then a second stage of thin-film coil 35 is formed. Thereafter, the nonmagnetic layer 50 is etched at a position corresponding to a center part of the thin-film coil 35, so as to form the contact hole 50*h*, thereby making a yoke part layer 34*b* to become a rear side part of the upper magnetic pole 34. Though two stages each of the thin-film coil 35 and photoresist layer 53 are laminated in this embodiment, the number of stages and procedure of forming are not limited thereto.

Next, an overcoat layer 25 is formed so as to cover the upper magnetic pole 34. The electrically conductive parts 41*a*, 41*b* shown in FIG. 4 can be formed essentially by the following procedure. Namely, after forming the heater 40*a* and extraction electrodes 85*a*, 85*b* (see FIG. 5), a resist pattern is formed such that the extraction electrodes 85*a*, 85*b* will not be covered with laminating materials thereafter. Then, the resist pattern is lifted off after forming the overcoat layer 25, for example. Subsequently, the electrically conductive parts 41*a*, 41*b* are formed by frame plating, for example, and heater electrode pads 23*a*, 23*b* are disposed at upper end parts thereof.

As with the heater 40*a*, the reproducing head part 31 and recording head part 32 are formed with electrically conductive parts, and recording electrode pads 21*a*, 21*b* and reproducing electrode pads 22*a*, 22*b* are disposed on the same surface of the head slider 13 together with the heater electrode pads 23*a*, 23*b* as shown in FIG. 3.

The foregoing yields the recording head part 32, thereby finishing the thin-film magnetic head 11.

Figure 6:
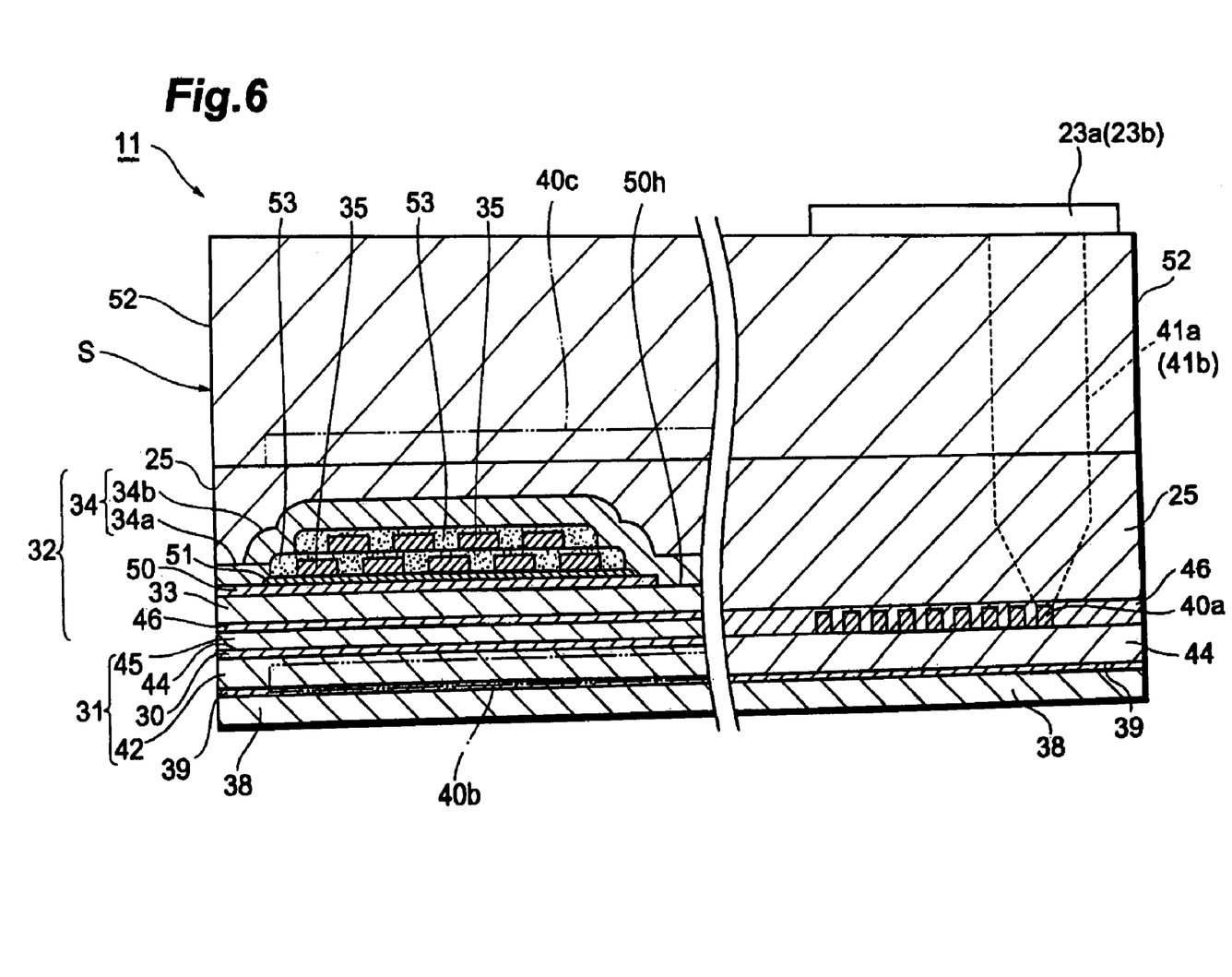
FIG. 6 is a view showing another embodiment with the heater placed at a different position.

Another mode of the position where the heater is placed will now be explained with reference to FIG. 6. As shown in this drawing, for example, the heater may be disposed in a layer located between the substrate 38 and the GMR device 30 (as with a heater 40*b* indicated by a dash-double-dot line in FIG. 6), or on the upper side of the recording head part 32 (as with a heater 40*c* indicated by a dash-double-dot line in FIG. 6).

When providing a heater at the position of the heater 40*c*, the heater 40*c* is initially formed on the overcoat layer 25, and then an overcoat layer 52 made of an insulating material such as $Al_2O_3$ is formed thereon by sputtering, for example.

Figure 7:
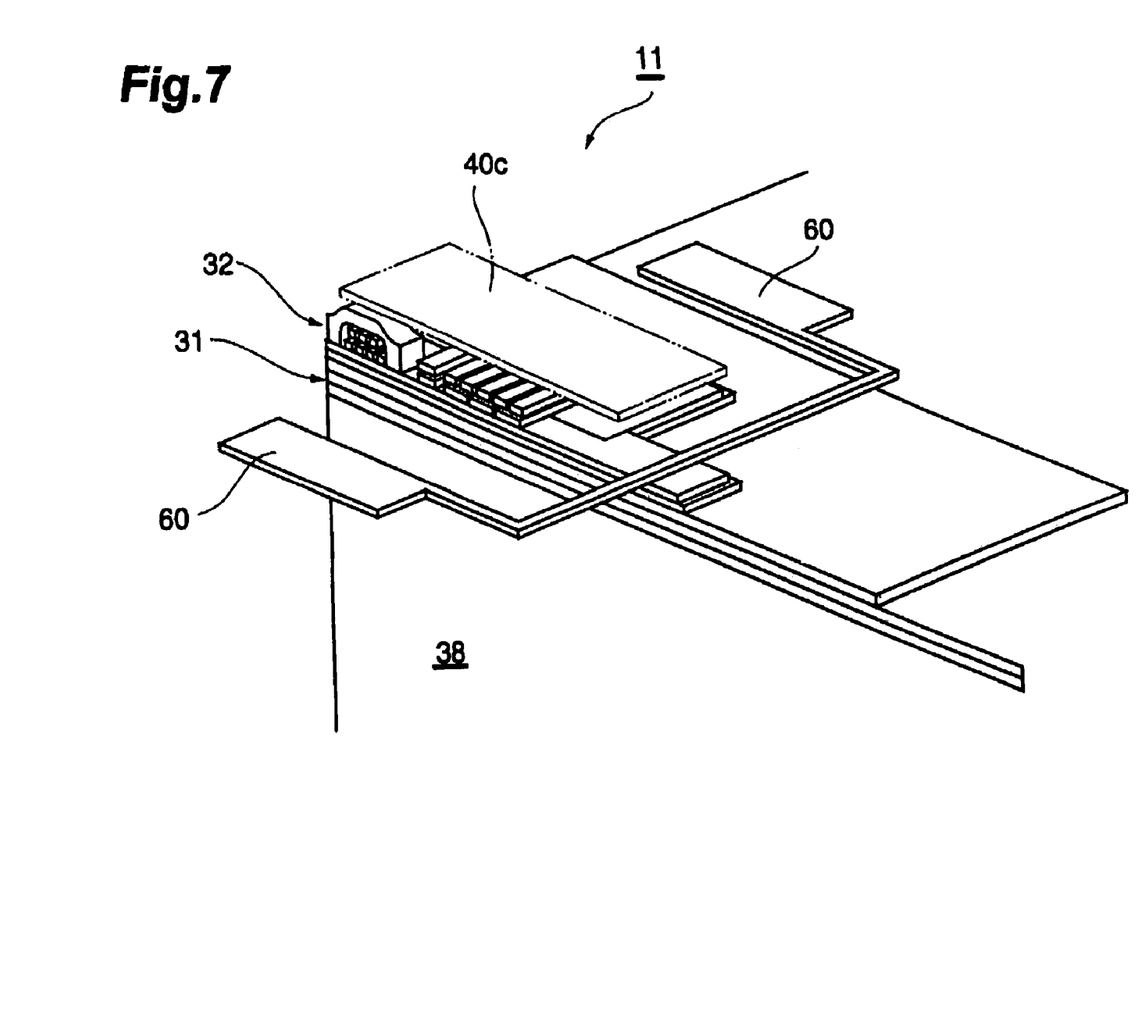
FIG. 7 is a schematic sectional view showing an example of a thin-film magnetic head with heaters arranged in a divided fashion.

The heater may be disposed solely at the above-mentioned position or divided into two and then placed there. FIG. 7 is a schematic sectional view showing an example of the thin-film magnetic head 11 in which divided heaters are arranged. In this drawing, heaters 60 arranged in a divided fashion are located at the same height as with the heater 40*c* disposed within the overcoat layer 52 shown in FIG. 6. Though FIG. 7 shows a divisional arrangement at the height of the heater 40*c*, the height is not limited thereto. For example, divided heaters may be arranged at the height of the heater 40*a* or 40*b* shown in FIG. 6.

When the thin-film magnetic head 11 is finished as mentioned above, a plurality of thin-film magnetic heads 11 are formed on a single substrate 38. For yielding the head slider 13 shown in FIG. 3 from this state, the substrate 38 is initially cut into a plurality of bars each comprising thin-film magnetic heads 11 arranged in a row, and then each bar is cut into blocks including their respective thin-film magnetic heads 11. Thereafter, a desirable slider rail (not depicted) is formed, whereby the head slider 13 is finished.

The head slider 13 is mounted on the leading end side of the suspension arm 12. One ends of the leads 17*a* to 17*c* laid on the suspension arm 12 are bonded to the terminals 15*a* to 15*f* disposed on the leading end side of the suspension arm 12, whereas the other ends are bonded to the terminals 16*a* to 16*f* disposed on the base end side of the suspension arm 12, whereby the head gimbal assembly 10 is obtained. After being produced as such, the head gimbal assembly 10 is set up such that the head slider 13 is made movable over the hard disk 2 while being adapted to record and reproduce magnetic signals, whereby the hard disk drive 1 shown in FIG. 1 is finished.

Though specifically explained with reference to embodiments in the foregoing, the present invention is not limited to the above-mentioned embodiments. For example, the second magnetic pole may be integrated instead of being divided into the magnetic pole part layer and yoke part layer. The thin-film magnetic head may be of perpendicular recording type instead of in-plane recording type. In place of the GMR device, AMR (Anisotropic MagnetoResistive) devices utilizing anisotropic magnetoresistive effects, TMR (Tunneling MagnetoResistive) devices utilizing magnetoresistive effects occurring at tunnel junctions, and the like may be used in the reproducing head part.

In the present invention, since the heater electrode pads are located on both sides of the group of the first and second device electrode pads within the same surface of the head slider, crosstalk can be prevented from occurring between the respective leads of the magnetoresistive device and inductive electromagnetic transducer.

The basic Japanese Application No. 2003-24621 filed on Jan. 31, 2003 is hereby incorporated by reference.

What is claimed is:

1. A head slider including a thin-film magnetic head comprising a magnetoresistive device for reproducing, an inductive electromagnetic transducer for recording, and a heater adapted to generate heat upon energization;

the head slider having a surface provided with a first device electrode pad for energizing the magnetoresistive device, a second device electrode pad for energizing the inductive electromagnetic transducer, and heater electrode pads for energizing the heater;

the heater electrode pads being located on both sides of a group of the first and second device electrode pads.

2. A head gimbal assembly comprising a head slider formed with a thin-film magnetic head, and an arm mounted with the head slider;

the thin-film magnetic head comprising a magnetoresistive device for reproducing, an inductive electromagnetic transducer for recording, and a heater adapted to generate heat upon energization;

the head slider having a surface provided with a first device electrode pad for energizing the magnetoresistive device, a second device electrode pad for energizing the inductive electromagnetic transducer, and heater electrode pads for energizing the heater;

the heater electrode pads being located on both sides of a group of the first and second device electrode pads.

3. A head gimbal assembly according to claim 2, wherein respective energizing leads connected to the first device electrode pad, second device electrode pad, and heater electrode pads are turned around from the surface provided with the electrode pads so as to extend toward a base end side of the arm; and wherein the leads for the heater electrode pads are located between the first and second device electrode pads in a region between the surface provided with the electrode pads and the base end of the arm.

4. A hard disk drive including a head gimbal assembly comprising a head slider formed with a thin-film magnetic head, and an arm mounted with the head slider;

the thin-film magnetic head comprising a magnetoresistive device for reproducing, an inductive electromagnetic transducer for recording, and a heater adapted to generate heat upon energization;

the head slider having a surface provided with a first device electrode pad for energizing the magnetoresistive device, a second device electrode pad for energizing the inductive electromagnetic transducer, and heater electrode pads for energizing the heater;

the heater electrode pads being located on both sides of a group of the first and second device electrode pads.

5. A hard disk drive according to claim 4, wherein respective energizing leads connected to the first device electrode pad, second device electrode pad, and heater electrode pads are turned around from the surface provided with the electrode pads so as to extend toward a base end side of the arm; and wherein the leads for the heater electrode pads are located between the first and second device electrode pads in a region between the surface provided with the electrode pads and the base end of the arm.

* * * * *